T. POWELL.

Boots and Shoes.

No. 6,522.

Reissued June 29, 1875.

WITNESSES

Granville Lewis

Melville Church. By

INVENTOR

Thomas Powell

Hill & Ellsworth

His Attorneys.

UNITED STATES PATENT OFFICE.

THOMAS POWELL, OF MARTINSVILLE, INDIANA, ASSIGNOR TO CALVIN HERSOME.

IMPROVEMENT IN BOOTS AND SHOES.

Specification forming part of Letters Patent No. 50,030, dated September 19, 1865; reissue No. 6,522, dated June 29, 1875; application filed June 12, 1875.

*To all whom it may concern:*

Be it known that I, THOMAS POWELL, of Martinsville, in the county of Morgan and State of Indiana, formerly of Richland, in the county of Rush and State of Indiana, have invented a new and useful Improvement in Gaiter Boots and Shoes; and I do hereby declare that the following is a full, clear, and exact description and specification of the same, reference being had to the accompanying drawings forming a part of this specification, in which—

Figure 1:
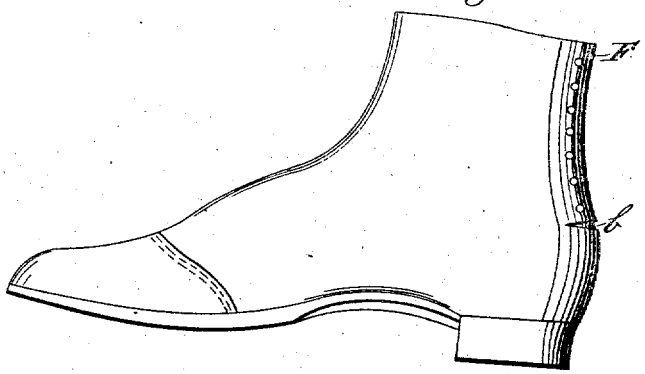
Figure 2:
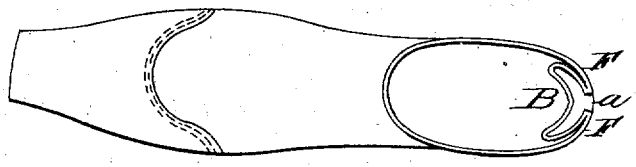
Figure 3:
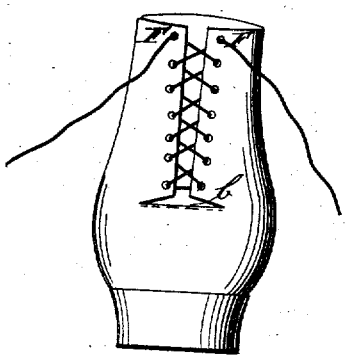
Figure 4:
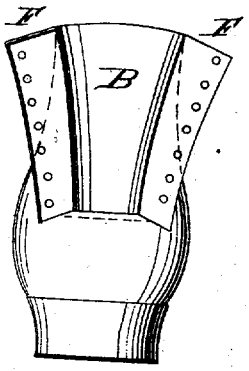

Figure 1 is a side view of my invention. Fig. 2 is a plan or top view of the same; and Figs. 3 and 4 are rear views of the same, the former showing the flaps nearly closed, and the latter showing them open.

Similar letters of reference in the accompanying drawings denote the same parts.

The object of this invention is to produce for public use a gaiter boot or shoe that will be neat and comfortable to the wearer; will be simple and economical to manufacture; will adapt itself to fit large and small ankles with equal perfection; can be put on and taken off with ease; will exclude water, dust, and cold air; can be easily and conveniently fastened upon the foot; will not impede the circulation of the blood; and can be worn loose or close, as the wearer may desire, without the use of elastic web in any form.

To these ends my invention consists, first, in a new mode of making the opening for the insertion of the foot; secondly, in a new mode of fitting the boot or shoe around the sides and rear of the ankle; thirdly, in a new mode of adapting it to exclude water, cold air, dust, &c.; and, lastly, in a new mode of adapting it to fit large and small ankles equally well without the use of elastic web, substantially as I will now proceed to set forth.

The main portions of the gaiter are constructed in the usual manner; but that part which incloses the ankle, and to which my invention particularly relates, is composed of a front and back, substantially as shown in Figs. 1 and 4, the opening of the boot or shoe being at the rear of the foot, and extending vertically down the back of the top or leg to or nearly to the heel, and horizontally from the back of the heel toward the front or instep, so as to make two flaps, F F, which are divided from each other by the vertical cut *a*, and from the counter by the horizontal cut or space *b*. The flaps are adapted to fit closely around, under, and back of the ankle-joints, and are fastened by a suitable fastening extending across the back from one flap to the other, one of the main objects being to bring their lower rear corners closely together when on the foot, and thus cause the leather or other material to fit nicely around and under the ankle-joint.

The horizontal opening allows the flaps, when unfastened, to open apart at their lower edge, as shown in Fig. 4, so as to admit the foot with ease without straining the leather or the seams.

The object of securing a perfect fit, which can be adjusted to any form or size of ankle, so that the boot or shoe can be easily put on or off, conveniently fastened, and comfortably worn loose or tight, is thus accomplished by the combination of the two cuts, which form the independent flaps, separated at their lower edges from the other material of the boot or shoe, so as to be capable of opening apart from each other at the bottom as well as at the top.

Were the boot or shoe constructed with these flaps alone, however, water, cold air, dust, dirt, &c., could enter it under the sides of the flaps as well as between them. To prevent such a liability I insert between the flaps a folding tongue or back, B, which is stitched to the inside of the flaps, and below and forward of the horizontal opening, thereby as effectually excluding cold, dampness, dirt, &c., as if no opening existed at the back of the boot or shoe. This tongue also interposes itself as a shield between the flaps or fastenings and the foot, to protect the latter from being rubbed or pinched, and its fullness gives ample space to admit the foot with ease.

I claim as my invention—

1. A shoe or gaiter having a vertical and horizontal opening at the rear, the front portions overlapping the back portion, and secured about the ankle by a suitable fastening passing across the back, substantially as described.

2. A shoe or gaiter the exterior of which is formed with a vertical opening at the rear and horizontal openings at the sides thereof, substantially as set forth.

3. A shoe or gaiter having an external vertical and horizontal opening at the rear part thereof, and a tongue or back stitched below and forward of the horizontal opening, substantially as set forth.

4. A shoe or gaiter having a vertical and horizontal opening at the rear part thereof, and a folding tongue or back, substantially as described.

5. A gaiter or shoe with front portions overlapping the back portion, the said front terminating in flaps at the rear part of the foot, formed by the horizontal and vertical cuts, substantially as described.

6. In a shoe or gaiter, the combination of a folding back with two independent flaps extending back from the front, and divided from the counter.

7. In a shoe or gaiter, the combination of a folding back with two independent flaps extending back from the front, and fastening together outside of the back.

THOMAS POWELL.

Witnesses:
ALEX. D. MCKERNAN,
C. HERSOME.